United States Patent
Chapman

(10) Patent No.: US 10,855,878 B2
(45) Date of Patent: Dec. 1, 2020

(54) SEGMENTATION HIDING LAYER FOR VECTOR PATTERN CORRELATION MARKS

(71) Applicant: Xerox Corporation, Norwalk, CT (US)

(72) Inventor: Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 269 days.

(21) Appl. No.: 15/933,740

(22) Filed: Mar. 23, 2018

(65) Prior Publication Data

US 2019/0297221 A1    Sep. 26, 2019

(51) Int. Cl.
| | |
|---|---|
| G06K 15/00 | (2006.01) |
| H04L 29/06 | (2006.01) |
| H04L 9/00 | (2006.01) |
| H04N 1/32 | (2006.01) |
| G06T 11/20 | (2006.01) |
| G06F 17/16 | (2006.01) |

(52) U.S. Cl.
CPC ......... *H04N 1/32352* (2013.01); *G06F 17/16* (2013.01); *G06T 11/20* (2013.01); *H04N 1/32149* (2013.01); *H04N 2201/0094* (2013.01)

(58) Field of Classification Search
CPC ...... H04N 1/32352; G06F 17/16; G06T 11/20
USPC ......................................................... 713/176
See application file for complete search history.

(56) References Cited

U.S. PATENT DOCUMENTS

| | | | |
|---|---|---|---|
| 5,528,290 A * | 6/1996 | Saund | G06K 9/20 348/218.1 |
| 5,734,752 A | 3/1998 | Knox | |
| 5,790,703 A | 8/1998 | Wang | |
| 6,106,021 A | 8/2000 | Phillips | |
| 6,252,971 B1 | 6/2001 | Wang | |
| 6,731,409 B2 | 5/2004 | Wang | |
| 7,070,252 B2 | 7/2006 | de Queiroz et al. | |
| 7,148,999 B2 | 12/2006 | Xu et al. | |
| 7,286,682 B1 * | 10/2007 | Sharma | B41J 3/60 382/100 |
| 7,738,143 B2 | 6/2010 | Ishimoto et al. | |
| 7,894,626 B2 | 2/2011 | Wang et al. | |
| 8,009,329 B2 | 8/2011 | Bala et al. | |
| 8,077,907 B2 | 12/2011 | Wang | |
| 8,179,570 B2 | 5/2012 | Zhao et al. | |
| 8,283,004 B2 | 10/2012 | Bala et al. | |
| 8,355,179 B2 | 1/2013 | Wu | |

(Continued)

*Primary Examiner* — Haresh N Patel
(74) *Attorney, Agent, or Firm* — Gibb & Riley, LLC

(57) ABSTRACT

A printable electronic document is received into a computerized device. The printable document contains original markings that can be printed on print media to produce a printed document. However, before printing, a computerized device adds first hidden markings to the printable electronic document. Such first hidden markings have a first vector graphic size. Further, the computerized device removes a pattern from the first hidden markings in the printable electronic document and adds (only to the removed pattern in the printable electronic document) second hidden markings that have the same vector graphic size as, but are out of phase with, the first hidden markings. Also, the computerized device adds geometrically shaped distraction markings to the printable electronic document. The geometrically shaped distraction markings have a second vector graphic size that is much larger than the first vector graphic size of the first and second hidden markings.

20 Claims, 7 Drawing Sheets

(56) References Cited

U.S. PATENT DOCUMENTS

| | | | |
|---|---|---|---|
| 8,821,996 | B2 | 9/2014 | Bala et al. |
| 9,264,575 | B1 * | 2/2016 | Chapman ............. H04N 1/3232 |
| 9,415,606 | B2 | 8/2016 | Chapman |
| 9,471,846 | B2 * | 10/2016 | Fan .................... G06K 9/00577 |
| 9,614,995 | B1 * | 4/2017 | Chapman ........... H04N 1/32309 |
| 9,628,661 | B2 | 4/2017 | Dolev |
| 9,628,663 | B1 | 4/2017 | Chapman |
| 9,661,186 | B1 * | 5/2017 | Chapman ............. H04N 1/4493 |
| 9,781,294 | B1 * | 10/2017 | Chapman ............. H04N 1/3232 |
| 9,813,579 | B1 | 11/2017 | Chapman |
| 10,009,503 | B1 * | 6/2018 | Chapman ........... H04N 1/32267 |
| 10,452,964 | B1 * | 10/2019 | Chapman ......... G06K 19/06046 |
| 2006/0280331 | A1 * | 12/2006 | Chosson .................. G07D 7/20 382/100 |
| 2009/0180152 | A1 * | 7/2009 | Bala ....................... H04N 1/387 358/3.28 |
| 2010/0150433 | A1 * | 6/2010 | Wang ................. H04N 1/00864 382/162 |
| 2010/0153580 | A1 * | 6/2010 | Tredoux ................ G06F 21/608 709/238 |
| 2010/0157377 | A1 * | 6/2010 | Zhao ..................... B41M 3/144 358/3.28 |
| 2010/0238513 | A1 * | 9/2010 | Morales ............. H04N 1/00005 358/3.28 |
| 2011/0191670 | A1 * | 8/2011 | Hoppenot ................ G06F 17/00 715/255 |
| 2011/0205569 | A1 * | 8/2011 | Eschbach ................ G06F 21/64 358/1.11 |
| 2013/0128317 | A1 * | 5/2013 | Chapman ................ H04N 1/54 358/2.1 |
| 2014/0055796 | A1 * | 2/2014 | Hannaway ............. H04N 1/387 358/1.3 |
| 2014/0312606 | A1 * | 10/2014 | Lister .................... B41M 3/148 283/85 |
| 2015/0043039 | A1 * | 2/2015 | Eschbach ........... G06K 15/1889 358/3.28 |
| 2015/0244897 | A1 * | 8/2015 | Chapman ................ H04N 1/32 358/1.14 |
| 2015/0271364 | A1 * | 9/2015 | Chapman ................ H04N 1/50 358/3.01 |
| 2016/0352961 | A1 | 12/2016 | Eschbach et al. |
| 2016/0364825 | A1 * | 12/2016 | Pan ..................... H04N 19/136 |
| 2017/0039422 | A1 * | 2/2017 | Eschbach ................ G06F 21/64 |
| 2019/0297221 | A1 * | 9/2019 | Chapman ........... H04N 1/32149 |

* cited by examiner

SEGMENTATION HIDING LAYER FOR VECTOR PATTERN CORRELATION MARKS

BACKGROUND

Systems and methods herein generally relate to security printing using vector patterns, and more particularly to combining different vector patterns that create hidden text with a segmentation hiding layer of specific vector graphic size.

In the area of security printing, documents are protected from copying, forging, and counterfeiting using multiple techniques. Some methods of security printing use standard materials such as papers, inks, and toners; however, more typically, security printing requires special and expensive printing materials. Example documents needing security printing include legal documents, negotiable documents, prescriptions, etc., where a user would like to be able to have a high level of confidence that the document is genuine.

Some security features, such as Correlation Marks (CR), use a screen or key (a screen or light filter printed on a transparency) to decode. Therefore, the genuineness of a document can be determined by viewing the document through the key, which reveals text that is hidden to the unaided human observer.

SUMMARY

Various methods herein receive a printable electronic document into a computerized device. The printable document contains original markings that can be printed on print media to produce a printed document. However, before printing, such methods use a computerized device to add first hidden markings to the printable electronic document. Such first hidden markings have a first vector graphic size (e.g., font size). Further, these methods then remove a pattern (which can form indicators, such as "genuine" or "original) from the first hidden markings in the printable electronic document and add (only to the removed pattern in the printable electronic document) second hidden markings that have a same vector graphic size as, but are out of phase with, the first hidden markings. The first hidden markings and the second hidden markings are the same vector graphics (e.g., parallel lines) that are completely out of phase with one another.

Also, these methods add geometrically shaped distraction markings to the printable electronic document. The geometrically shaped distraction markings have a second vector graphic size that is much larger than (a multiple of) the first vector graphic size (e.g., is more than five times the first vector graphic size and less than twenty times the first vector graphic size). The geometrically shaped distraction markings comprise circles, ovals, triangles, rectangles, pentagons, hexagons, heptagons, octagons, nonagons, decagons, or any other useful shape, etc. The first and second hidden markings, and the geometrically shaped distraction markings, can be added anywhere (e.g., even to all areas of the printable electronic document) but do not interfere with the original markings.

These methods print the printable electronic document using a printing device that is in communications with the computerized device after adding the first hidden markings, the second hidden markings, and the geometrically shaped distraction markings, and this produces a printed document. One feature herein is that the pattern in the printed document is only visible when the printed document is viewed with a light filter. Thus, when viewing the printed document without the light filter, the pattern between the first hidden markings and the second hidden markings is not visible, at least in part because of the geometrically shaped distraction markings; and when viewing the printed document with the light filter, the pattern between the first hidden markings and the second hidden markings is visible.

Systems herein include (among other components) a computerized device that is adapted to receive a printable electronic document and a printing device that can be integral with (but at least is in communications with) the computerized device. Before printing, the computerized device automatically adds the first hidden markings to the printable electronic document, automatically removes the pattern from the first hidden markings in the printable electronic document, automatically adds the second hidden markings only to the pattern in the printable electronic document, and automatically adds geometrically shaped distraction markings to the printable electronic document. Again, the geometrically shaped distraction markings have a second vector graphic size that is a multiple of the first vector graphic size (e.g., is more than five times, and less than twenty times, the first vector graphic size) of the first and second hidden markings. The printing device automatically prints the printable electronic document after the computerized device adds the first hidden markings, the second hidden markings, and the geometrically shaped distraction markings, to produce a printed document. Again, the pattern in the printed document is only visible when the printed document is viewed with a light filter.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, some security features, such as correlation marks (CR), use a screen or key to decode. The key is a screen or optical light filter made by printing a pattern of light interference lines on a transparent sheet of material, such as plastic or glass (e.g., a transparency). Usually the key is placed on (or held within millimeters of) the document when decoding hidden markings. While the use of a key is normally required to observe text that is hidden to the unaided human observer, sometimes the hidden text of correlation marks can be seen, even without the use of the key, depending upon the fonts of the correlation marks and the fonts of the hidden text.

In view of such issues, the methods and systems herein use a segmentation hiding layer that includes polygons whose vector graphic size is based on the vector graphic size (e.g., parallel lines) that are used as the correlation marks. Vector graphic size in the inverse of the frequency (1/freq.) and can be a rectangle having height and width in matching the extremes of a vector graphic. For example, text characters and numbers are generally oriented to have a top, bottom, and sides; and are measured using font sizes (which are a type of vector graphic size). Font sizes usually have a height measure between the top and bottom that is larger than a string width measure between the sides. However, graphic elements (corporate logos, graphic designs, figurative elements, etc.) can be measured using squares, rectangles that are wider than they are taller, or vice versa. Therefore, while the term "font" size is sometimes used in this disclosure, its use is only exemplary of one of many different ways to measure vector graphic size.

Figure 1:
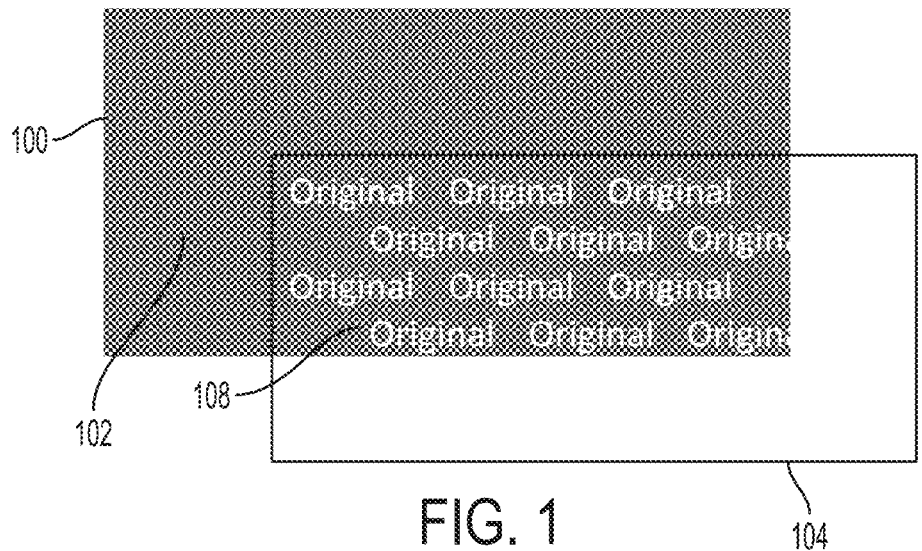
FIG. 1 is a schematic diagram illustrating the use of keys with images by methods and systems herein.

More specifically, as shown in FIG. 1, when items are printed using methods and systems described herein, the same document 100 appears differently through a key 104 than it does when observed by an unaided human (a human observer viewing without magnification, special lighting, or optical filters) regardless of the fonts of the correlation marks and the fonts of the hidden text. Therefore, printed correlation marks 102 on the document 100 have a uniform pattern to the unaided human observer; however, when the document 100 is viewed through the key 104 (which is shown partially covering the document 100 in FIG. 1) the hidden text 108 "Original" appears. The hidden text 108 is not visible on portions of the document 100 over which the key 104 is not located.

Figure 2A:
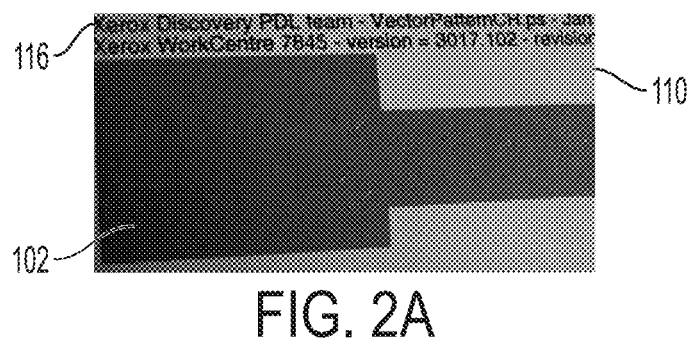
FIGS. 2A-2B are photographs illustrating the use of keys with images by methods and systems herein.
Figure 2B:
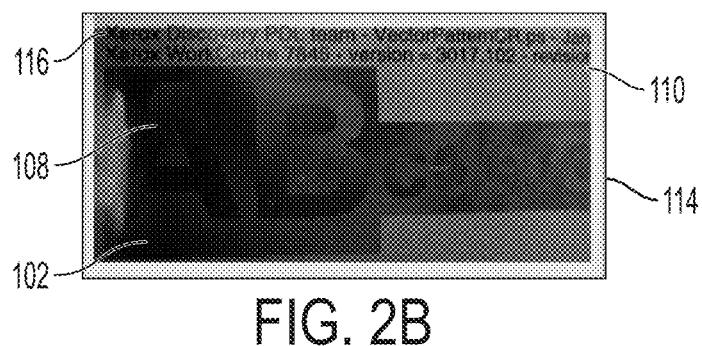

FIGS. 2A-2B are photographs that similarly illustrate a printed region 102 of another document 110 containing correlation marks printed using the systems and methods described herein. As can be seen in FIG. 2A, the printed region 102, when viewed without a filter, appears as an uninterrupted continuous pattern. However, in FIG. 2B, the same printed region 102 viewed with a filter 114 reveals hidden text 108 "ABcdefg." The printed document shown in FIGS. 2A-2B also includes original markings 116 that are not obscured by the printed correlation marks 102, and that are still observable through the key 114.

Figure 3A:
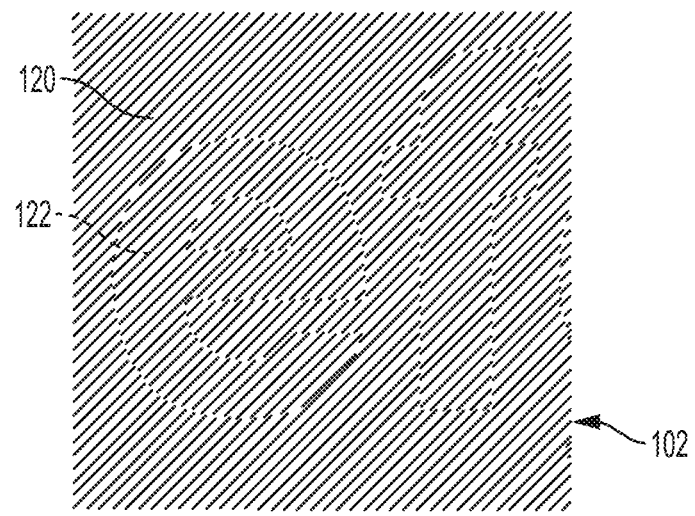
FIGS. 3A-3B are schematic diagrams illustrating the use of vector graphics by methods and systems herein.
Figure 3B:
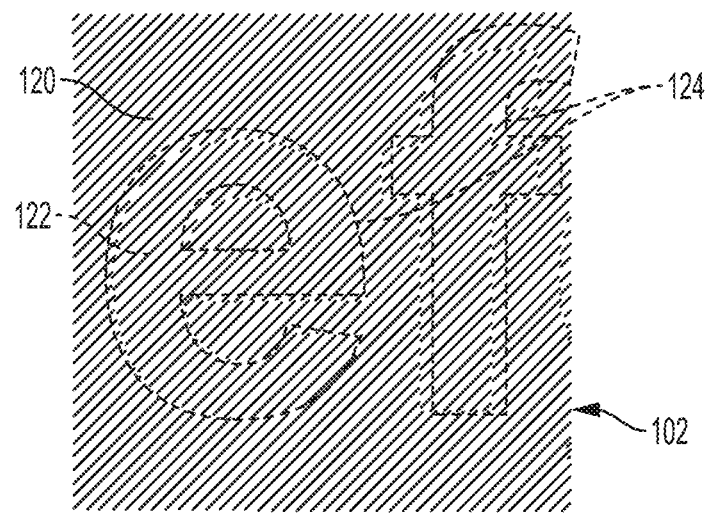

In greater detail, systems and methods herein receive a printable electronic document into a computerized device. The printable document contains original markings 116 that can be printed on print media to produce a printed document. However, before printing, such methods use a computerized device to add first hidden markings to the printable electronic document. Such first hidden markings have a first vector graphic size. Further, these methods then remove a pattern (which can form indicators, such as "genuine" or "original) from the first hidden markings in the printable electronic document and add (only to the pattern that was removed from the printable electronic document) second hidden markings that have a same vector graphic size as, but are out of phase with, the first hidden markings. The result is shown in FIGS. 3A-3B, where item 120 points to the first hidden markings (parallel line vector graphics), item 122 points to the second hidden markings (parallel line vector graphics) within printed correlation marks 102, and (in FIG. 3B) item 124 points to the pattern, which is shown using dashed lines to aid in understanding. As can be seen in FIGS. 3A-3B, the first hidden markings 120 and the second hidden markings 122 are the same vector graphics (e.g., parallel lines) that are completely (180°) out of phase with one another.

Note that FIGS. 3A-3B illustrate the same items, and the dashed lines are added to FIG. 3B only as an aid to see where the pattern is in FIG. 3A. Therefore, the representation in FIG. 3B would not ever be printed, and only that shown in FIG. 3A would be printed. Thus, the dashed lines 124 do not appear in the document 100 or 110, but are only added to the drawings of this disclosure to help the reader of this disclosure understand where the pattern 124 is located, in case the pattern is not easily observable in FIG. 3A.

Figure 4:
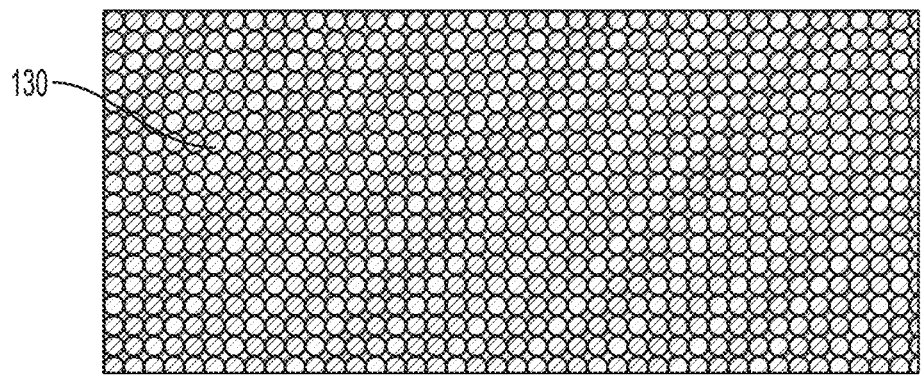
FIGS. 4-5 are schematic diagrams illustrating geometrically shaped distraction markings produced by methods and systems herein.
Figure 5:
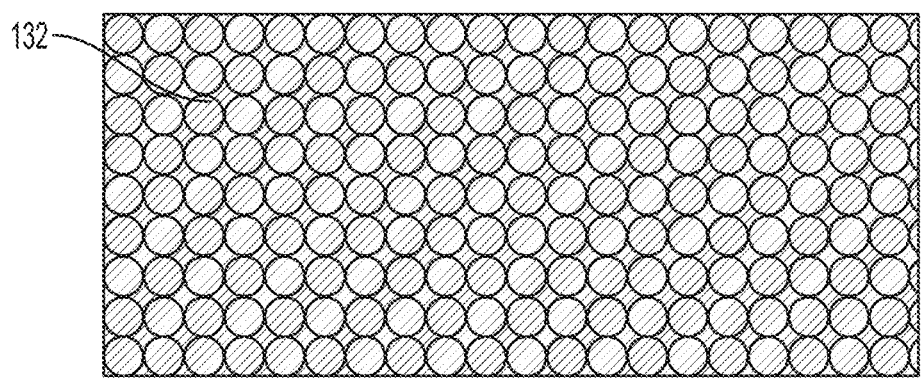

Also, these methods and systems add geometrically shaped distraction markings to the previously added hidden markings 120, 122 in the printable electronic document. Examples of geometrically shaped distraction markings 130, 132 produced by methods and systems herein are shown in FIGS. 4-5. In this example, the geometrically shaped distraction markings 130, 132 are circles, and form a honeycomb pattern. The geometrically shaped distraction markings 132 have a larger vector graphic size relative to the geometrically shaped distraction markings 130.

Note that while the geometrically shaped distraction markings 130, 132 are shown in FIGS. 4-5 are circles, the geometrically shaped distraction markings can be ovals, triangles, rectangles, pentagons, hexagons, heptagons, octagons, nonagons, decagons, or any shape, etc. The first hidden markings 120, 122 (vector graphics) and the geometrically shaped distraction markings 130, 132 can be added to just a portion of a printable electronic document, or to all areas of the printable electronic document, so long as such markings do not interfere with the original markings (116 in FIGS. 2A-2B).

One of the features of these methods and systems is that the geometrically shaped distraction markings 130, 132 that are added to the hidden markings 120, 122 have a much larger vector graphic size than (a multiple of) the first vector graphic size of the hidden markings 120, 122. More specifically, the geometrically shaped distraction markings 130, 132 can, for example, have a second vector graphic size that is more than five times (>5×) the first vector graphic size of the hidden markings 120, 122 and less than twenty times (<20×) the first vector graphic size of the hidden markings 120, 122.

Figure 6:
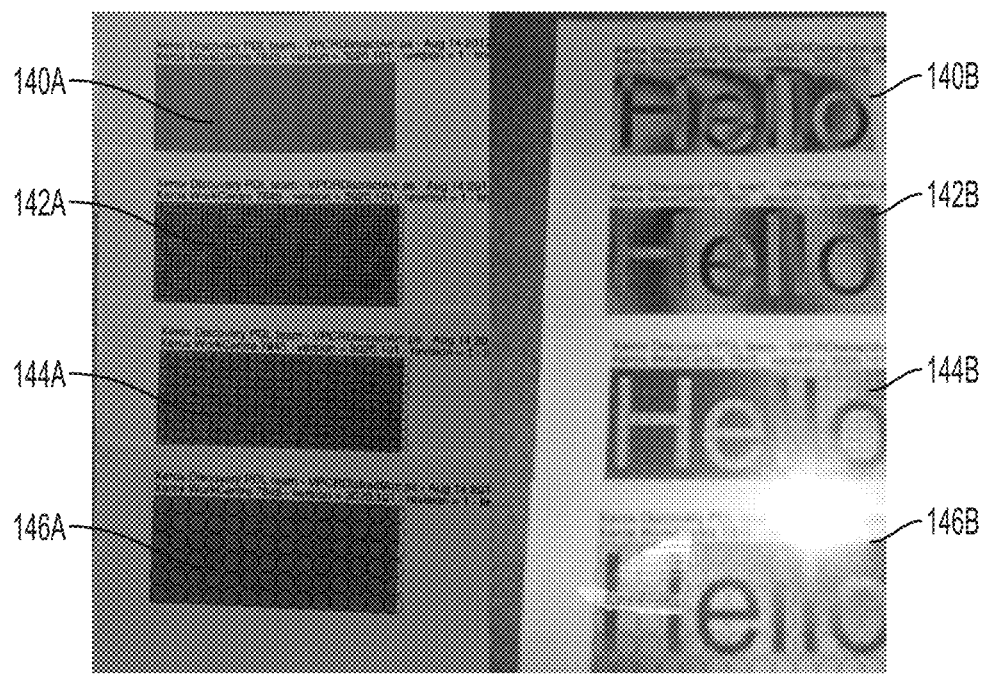
FIG. 6 is a photograph illustrating the effect of geometrically shaped distraction markings produced by methods and systems herein.

This is shown in the photographs appearing in FIG. 6, which illustrates images of printed documents viewed without a key (140A, 142A, 144A, and 146A) and the same documents viewed with a key (relatively, 140B, 142B, 144B, and 146B). All the pictures shown in FIG. 6 use the same vector graphic size hidden markings (vector graphics), and the only change between the documents (140A, 142A, 144A, and 146A) are geometrically shaped distraction markings of progressively larger vector graphic sizes added to the vector graphics. Therefore, image 140A-B has the smallest vector graphic size geometrically shaped distraction markings, while image 146A-B has the largest vector graphic size geometrically shaped distraction markings, with the intervening drawings progressing upward in vector graphic size.

As can be seen in FIG. 6, as the vector graphic size of the geometrically shaped distraction markings increases, the ability to see the pattern difference in the vector graphics decreases. Specifically, it is easier to see the word "Hello" in image 140A than it is in image 146A because image 140A has a smaller vector graphic size than image 146A. Additionally, FIG. 6 shows that there is a very minor interference when using the light filter (e.g., 140B being slightly different than 146B) but there is a larger difference between 140A and 146A when the light filter is not present. Therefore, by increasing the second vector graphic size of the geometrically shaped distraction markings relative to the first vector graphic size of the hidden markings 120, 122, the geometrically shaped distraction markings 130, 132 become a more effective segmentation hiding layer.

However, if the second vector graphic size of the geometrically shaped distraction markings 130, 132 is increased too much relative to the first vector graphic size of the hidden markings 120, 122, the hiding layer becomes less effective. Therefore, it has been found that when the geometrically shaped distraction markings 130, 132 have a second vector graphic size that is more than five times (>5×) the first vector graphic size of the hidden markings 120, 122, but less than twenty times (<20×) the first vector graphic size of the hidden markings 120, 122, the geometrically shaped distraction markings 130, 132 provide a highly effective segmentation hiding layer. More accurately, this can be restated as: the inverse frequency of the polygons of the geometrically shaped distraction markings ($1/f_D$) is between 5 and 20 times the inverse frequency of the lines of the vector graphic ($1/f_{CR}$); or this can be alternatively presented: $5/f_{CR}<1/f_D<20/f_{CR}$. Again, these numbers are only one example, and specific applications can use different multiples and ranges of the foregoing concepts.

Further, such a result is unexpected because one skilled in the art would solve the above-stated problem of vector graphics being visible without a key by matching the font of the hidden text (making up the pattern between the first and second hidden markings) with the font of vector graphics (because that is how such a problem has been solved in the past). If such had been attempted, which it does not appear to have been, the use of a hiding layer over a CR mark would be expected to hide all vector graphic fonts equally. In other words, if a hiding layer had been used (which it does not appear to have been) the hiding layer would be expected to hide all sized vector graphic fonts the same. This makes the result produced by the methods and systems herein (which maintain a relationship between the vector graphic size of the geometric markings and the vector graphics) unexpected. Further, such methods and systems unexpectedly increase the effectiveness of the hiding layer. Additionally, while noise and/or blocky objects (e.g., blocky bit mapped fonts) could be used, both greatly decrease the quality of the CR mark when using a key.

Figure 7:
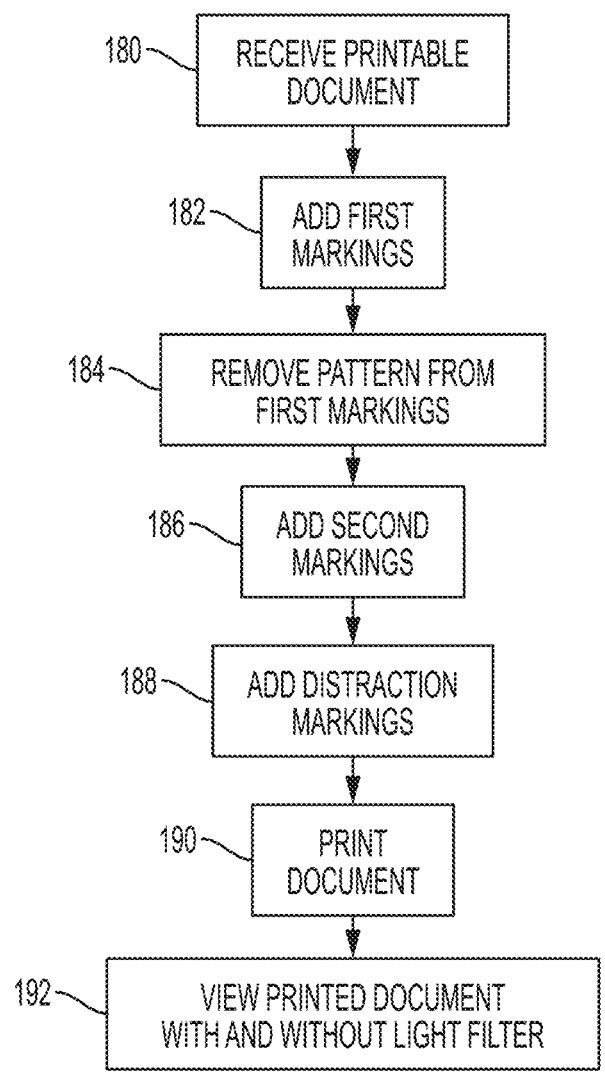
FIG. 7 is a flow diagram of various methods herein.

FIG. 7 is flowchart illustrating exemplary methods herein. In item 180, these methods receive a printable electronic document into a computerized device. The printable document contains original markings that can be printed on print media to produce a printed document. However, before printing, such methods use a computerized device to add first hidden markings to the printable electronic document in item 182. Such first hidden markings have a first vector graphic size (inverse of frequency of parallel lines in the hidden markings ($1/f_{CR}$)). Further, these methods then remove a pattern from the first hidden markings in the printable electronic document in item 184 and add second hidden markings that have a same vector graphic size as, but are out of phase with, the first hidden markings, only to the pattern in the printable electronic document in item 186. The first hidden markings and the second hidden markings are the same vector graphics (e.g., the same parallel lines) that are completely out of phase with one another.

Also, in item 188, these methods add geometrically shaped distraction markings to the printable electronic document. The geometrically shaped distraction markings have a second vector graphic size (inverse of frequency of polygons of the geometrically shaped distraction markings ($1/f_D$)) that is a multiple of the first vector graphic size (e.g., is more than five times the first vector graphic size and less than twenty times the first vector graphic size). The geometrically shaped distraction markings comprise circles, ovals, triangles, rectangles, pentagons, hexagons, heptagons, octagons, nonagons, decagons, or other shapes, etc. The first hidden markings and the geometrically shaped distraction markings can be added to any, or all, areas of the printable electronic document, but do not interfere with the original markings.

These methods print the printable electronic document in item 190 using a printing device that is in communications with the computerized device after adding the first hidden markings, the second hidden markings, and the geometrically shaped distraction markings, and this produces a printed document. The printed document is viewed with and without the filter in item 192. One feature herein is that the pattern in the printed document is only visible when the printed document is viewed with a key or light filter. Thus, when viewing the printed document without the light filter, the pattern between the first hidden markings and the second hidden markings is not visible, in part because of the geometrically shaped distraction markings, and when viewing the printed document with the light filter, the pattern between the first hidden markings and the second hidden markings is visible.

The hardware described herein plays a significant part in permitting the foregoing method to be performed, rather than function solely as a mechanism for permitting a solution to be achieved more quickly, (i.e., through the utilization of a computer for performing calculations). As would be understood by one ordinarily skilled in the art, the processes described herein cannot be performed by a human alone (or one operating with a pen and a pad of paper) and instead such processes can only be performed by a machine (especially when the volume of data being processed, and the speed at which such data needs to be evaluated is considered). For example, if one were to manually attempt to alter the bitmaps of images to add such a segmentation hiding layer to the vector graphics performed by the methods and devices discussed above, the manual process would be sufficiently inaccurate and take an excessive amount of time so as to render the manual classification results useless. Specifically, processes such as processing scanned data pixel-by-pixel, electronically storing bitmaps as 1's and 0's, etc., requires the utilization of different specialized machines, and humans performing such processing would not produce useful results because of the time lag, inconsistency, and inaccuracy humans would introduce into the results.

Further, such machine-only processes are not mere "post-solution activity" because the methods utilize machines at each step, and cannot be performed without machines. In other words, these various machines are integral with the methods herein because the methods cannot be performed without the machines (and cannot be performed by humans alone).

Additionally, the methods herein solve many highly complex technological problems. For example, as mentioned above, while the use of a key is normally required to observe text that is hidden to the unaided human observer, sometimes the hidden text can be seen, even without the use of the key, depending upon the vector graphic size of the correlation marks and the vector graphic size of the hidden text. Methods herein solve this technological problem by using a segmentation hiding layer that includes polygons whose vector graphic size is based on the vector graphic size (e.g., parallel lines) of the correlation marks.

Figure 8:
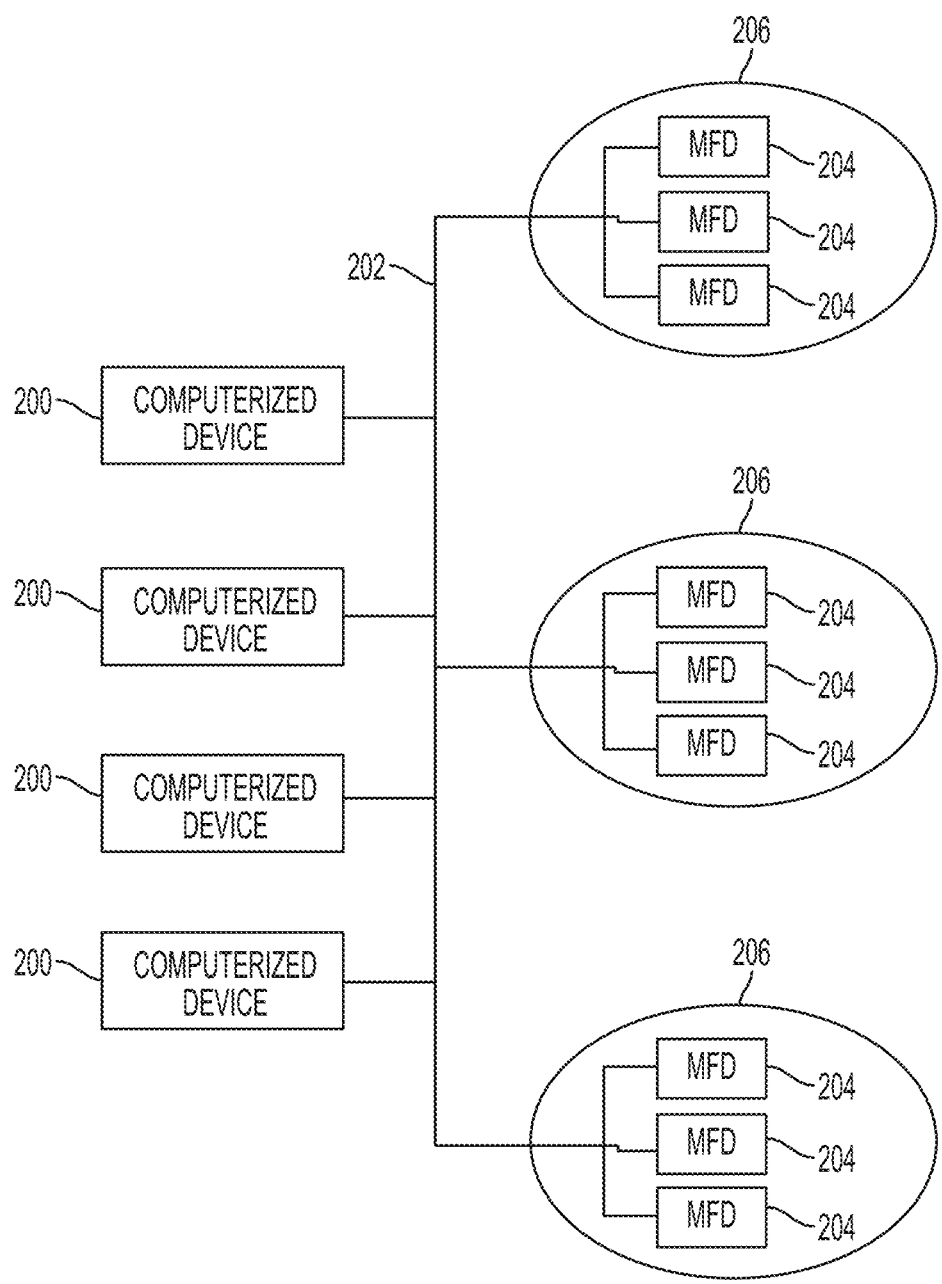
FIG. 8 is a schematic diagram illustrating systems herein.

As shown in FIG. 8, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 9:
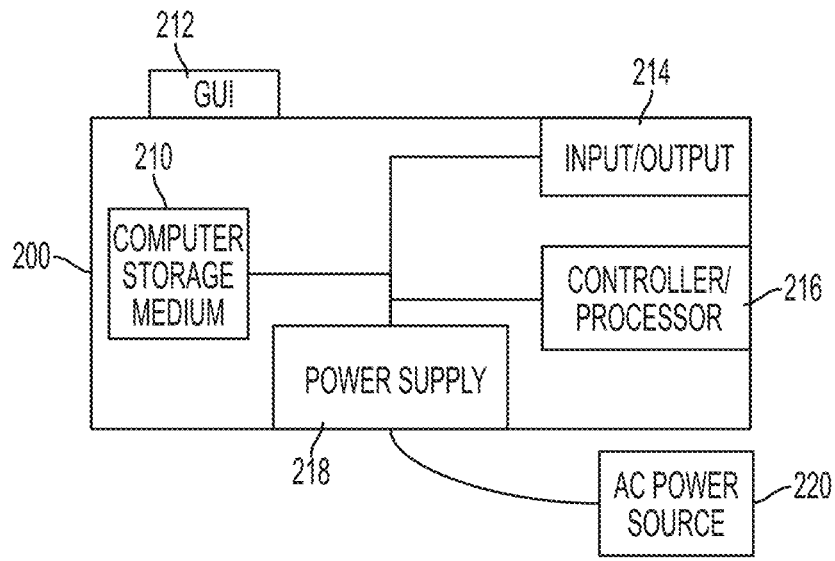
FIG. 9 is a schematic diagram illustrating devices herein.

FIG. 9 illustrates a computerized device 200, which can be used with systems and methods herein and can comprise, for example, a print server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 9, a body housing has one or more functional components that operate on power supplied from an alternating current (AC) source 220 by the power supply 218. The power supply 218 can comprise a common power conversion unit, power storage element (e.g., a battery, etc), etc.

Figure 10:
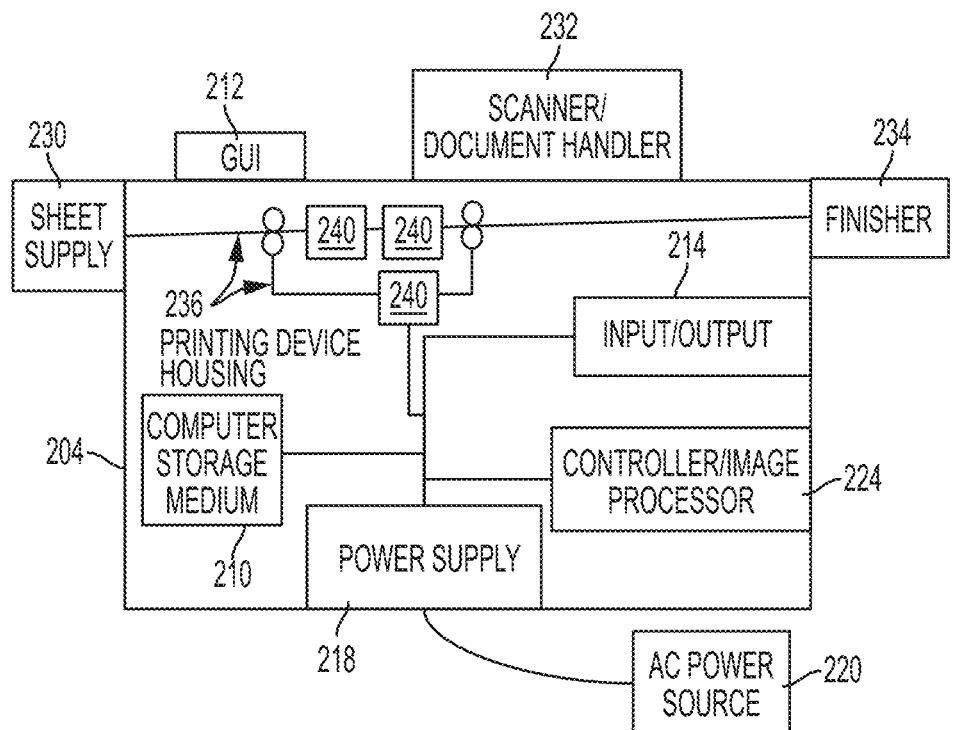
FIG. 10 is a schematic diagram illustrating devices herein.

FIG. 10 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engine(s)) 240 operatively connected to a specialized image processor 224 (that is different from a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

Systems herein include (among other components) the computerized device 200 that is adapted to receive a printable electronic document and the printing device 204 that can be integral with (but at least is in communications with) the computerized device 200. Before printing, the computerized device 200 automatically adds the first hidden markings to the printable electronic document, automatically removes the pattern from the first hidden markings in the printable electronic document, automatically adds the second hidden markings only to the pattern in the printable electronic document, and automatically adds geometrically shaped distraction markings to the printable electronic document. Again, the geometrically shaped distraction markings have a second vector graphic size that is more than five times, and less than twenty times, the first vector graphic size of the first and second hidden markings. The printing device 204 automatically prints the printable electronic document after the computerized device 200 adds the first hidden markings, the second hidden markings, and the geometrically shaped distraction markings, to produce a printed document. Again, the pattern in the printed document is only visible when the printed document is viewed with a light filter.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
   receiving a printable electronic document;
   adding first hidden markings to the printable electronic document, wherein the first hidden markings have a first vector graphic size;
   removing a pattern from the first hidden markings in the printable electronic document;
   adding second hidden markings that have a same vector graphic size as, and are out of phase with, the first hidden markings only to the pattern in the printable electronic document; and
   adding geometrically shaped distraction markings to the printable electronic document, wherein the geometrically shaped distraction markings have a second vector graphic size that is a multiple of the first vector graphic size.

2. The method according to claim 1, wherein the geometrically shaped distraction markings comprise circles, ovals, triangles, rectangles, pentagons, hexagons, heptagons, octagons, nonagons, or decagons.

3. The method according to claim 1, wherein the second vector graphic size is at least 5 times the first vector graphic size.

4. The method according to claim 1, wherein the second vector graphic size is between 5 and 20 times the first vector graphic size.

5. The method according to claim 1, wherein the first hidden markings and the second hidden markings are the same vector graphics that are out of phase.

6. The method according to claim 5, wherein the vector graphics comprise parallel lines.

7. The method according to claim 1, wherein the first hidden markings and the second hidden markings are the same vector graphics that are completely out of phase with one another.

8. A method comprising:
   receiving a printable electronic document into a computerized device;
   before printing, using the computerized device to:
      add first hidden markings to the printable electronic document, wherein the first hidden markings have a first vector graphic size;
      remove a pattern from the first hidden markings in the printable electronic document;
      add second hidden markings that have a same vector graphic size as, and are out of phase with, the first hidden markings only to the pattern in the printable electronic document; and
      add geometrically shaped distraction markings to the printable electronic document, wherein the geometrically shaped distraction markings have a second vector graphic size that is more than five times, and less than twenty times, the first vector graphic size; and
   printing the printable electronic document using a printing device that is in communications with the computerized device after adding the first hidden markings, the second hidden markings, and the geometrically shaped distraction markings, to produce a printed document,
   wherein the pattern in the printed document is only visible when the printed document is viewed with a light filter.

9. The method according to claim 8, wherein the geometrically shaped distraction markings comprise circles, ovals, triangles, rectangles, pentagons, hexagons, heptagons, octagons, nonagons, or decagons.

10. The method according to claim 8, wherein the second vector graphic size is at least 5 times the first vector graphic size.

11. The method according to claim 8, wherein the second vector graphic size is between 5 and 20 times the first vector graphic size.

12. The method according to claim 8, wherein the first hidden markings and the second hidden markings are the same vector graphics that are out of phase.

13. The method according to claim 12, wherein the vector graphics comprise parallel lines.

14. The method according to claim 8, wherein the first hidden markings and the second hidden markings are the same vector graphics that are completely out of phase with one another.

15. A system comprising:
   a computerized device adapted to receives a printable electronic document;
   a printing device in communications with the computerized device,
   wherein before printing, the computerized device:
      automatically adds first hidden markings to the printable electronic document, wherein the first hidden markings have a first vector graphic size;
      automatically removes a pattern from the first hidden markings in the printable electronic document;
      automatically adds second hidden markings that have a same vector graphic size as, and are out of phase with, the first hidden markings only to the pattern in the printable electronic document; and
      automatically adds geometrically shaped distraction markings to the printable electronic document, wherein the geometrically shaped distraction markings have a second vector graphic size that is more than five times, and less than twenty times, the first vector graphic size,
   wherein the printing device automatically prints the printable electronic document after the computerized device adds the first hidden markings, the second hidden markings, and the geometrically shaped distraction markings, to produce a printed document, and
   wherein the pattern in the printed document is only visible when the printed document is viewed with a light filter.

16. The system according to claim 15, wherein the geometrically shaped distraction markings comprise circles, ovals, triangles, rectangles, pentagons, hexagons, heptagons, octagons, nonagons, or decagons.

17. The system according to claim 15, wherein the second vector graphic size is at least 5 times the first vector graphic size.

18. The system according to claim 15, wherein the second vector graphic size is between 5 and 20 times the first vector graphic size.

19. The system according to claim 15, wherein the first hidden markings and the second hidden markings are the same vector graphics that are out of phase.

20. The system according to claim 19, wherein the vector graphics comprise parallel lines.

* * * * *